(No Model.)
P. WOMPLER.
WELL DRILLING MACHINE.
No. 466,970. Patented Jan. 12, 1892.
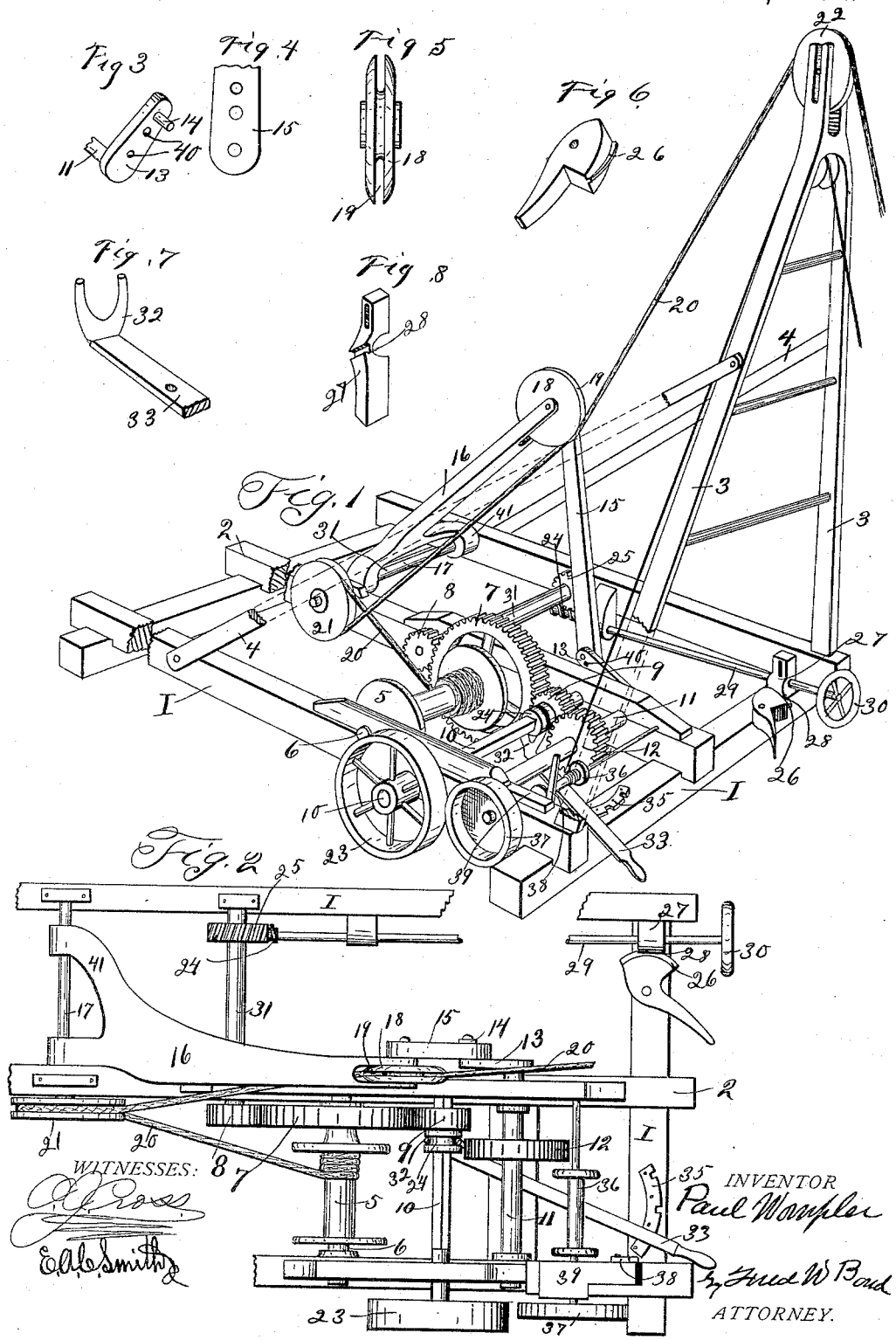

UNITED STATES PATENT OFFICE.

PAUL WOMPLER, OF WEST BROOKFIELD, OHIO.

WELL-DRILLING MACHINE.

SPECIFICATION forming part of Letters Patent No. 466,970, dated January 12, 1892.

Application filed July 16, 1891. Serial No. 399,785. (No model.)

*To all whom it may concern:*

Be it known that I, PAUL WOMPLER, a citizen of the United States, residing at West Brookfield, in the county of Stark and State of Ohio, have invented certain new and useful Improvements in Well-Drilling Machines; and I do hereby declare that the following is a full, clear, and exact description of the same, reference being had to the annexed drawings, making a part of this specification, and to the letters of reference marked thereon, in which—

Figure 1 is a perspective view. Fig. 2 is a top view showing parts broken away. Fig. 3 is a detached view of a portion of the crank-shaft, showing its crank and wrist-pin properly located. Fig. 4 is a view showing the bottom or lower portion of the pitman. Fig. 5 is a detached edge view of the drill-rope-operating wheel. Fig. 6 is a detached view of the let-off eccentric and its operating-lever. Fig. 7 is a detached view of the yoke and a portion of its operating lever or handle. Fig. 8 is a detached view of the movable let-off shaft box or bearing.

The present invention has relation to well-drilling machines; and it consists in the different parts and combination hereinafter described, and particularly pointed out in the claims.

Similar numbers represent corresponding parts in all the figures of the drawings.

In the accompanying drawings, 1 represents the frame of the drilling-machine proper, which, when it is desired to provide a portable machine, is mounted upon a wagon in the ordinary manner. For the purpose of providing a means for properly locating and providing bearings for the different parts—such as the propelling-shaft, drill-rope spool, and sand-wheel—the center piece or sill 2 is provided, which is attached to the frame 1 in any convenient and well-known manner.

To the drill end of the machine is fixed the derrick 3, which is secured in an upright position by means of the braces 4. The drill-rope spool 5 is attached to the shaft 6, which shaft is properly journaled to the frame 1 and the sill 2. The shaft 6 is also provided with the cog-wheel 7, which cog-wheel meshes with the pinion 8. Rotary motion is communicated to the wheel 7 by means of the pinion 9, which pinion is mounted on the power-shaft 10. The pinion 9 is so attached to the power-shaft 10 that it can be moved back and forth on said power-shaft, for the purpose hereinafter described. The shaft 11 is located substantially as illustrated in the drawings, and, as shown, it is provided with the cog-wheel 12, which is for the purpose of communicating rotary motion to the shaft 11 by means of the pinion 9.

To the shaft 11 is securely attached in any convenient and well-known manner the crank 13, which crank is provided with the wrist-pin 14, said wrist-pin being for the purpose of connecting the bottom or lower end of the pitman 15, the top or upper end of said pitman being pivotally connected to the free end of the rock-arm 16, said rock-arm being journaled to the shaft 17, which shaft is properly attached to the frame 1 and the sill 2.

To the free end of the rock-arm is properly journaled the drill-rope-operating wheel 18, which wheel is provided with the deep groove 19, which groove is for the purpose of receiving the drill-rope 20, said drill-rope being attached at one end to the spool 5, and when in use a sufficient amount of rope is wound upon the spool 5 to drill a well of the desired depth, said rope extending around and under the grooved pulley 21, thence under the grooved wheel 18 and through the groove 19, thence over the pulley 22, and downward to the point where the drill is attached in the ordinary manner.

In use, when it is desired to operate the drilling-machine, power is applied to the wheel 23 by means of a belt leading from an engine or other motor, which in turn communicates a rotary motion to the crank 13 by means of the pinion 9 and the wheel 12, fixed to the shaft 11.

It will be understood that as the crank 13 descends it will carry with it the pitman 15, the wheel 18, and the rock-arm 16, which carries or pulls the drill-rope 20 downward between the grooved pulleys 21 and 22 and elevates that portion of the rope 20 located beyond or extending over the pulley 21, thereby elevating the drill.

When the crank 13 commences to move upward as it rotates, the drill-rope 20 will be released and permit the drill to drop to the bottom of the well. When it is desired to let out the rope 20 as the well descends, the worm-screw 24 is thrown into engagement with the worm-wheel 25 by means of the eccentric 26, which operates the sliding box 27 by means of said eccentric engaging the groove 28 and moving the sliding box 27 downward. The shaft 29 is provided with the operating-wheel 30 or its equivalent, which is for the purpose of communicating rotary motion to the shaft 29 and the worm-screw 24, which in turn communicates rotary motion to the spool 5 by means of the shaft 31, pinion 8, and wheel 7. The worm-screw 24 should be kept in contact with the worm-wheel 25 at all times while the machine is at work for the purpose of securely holding the spool 5 and prevent said spool 5 from rotating and unwinding the drill-rope.

When it is desired to lower the tool after it has been removed from the well for the purpose of pumping said well or any other purpose, the worm-screw 24 should be disengaged from the worm-wheel 25, thereby permitting the shaft 31 to revolve as the rope 20 is unwound from the spool 5. When the drill is at work, the pinion 9 is moved along the power shaft 10 until it is disengaged from the wheel 7 and brought into contact or engagement with the wheel 12 by means of the yoke 32, and the operating-handle 33, and the grooved collar 24, said grooved collar being preferably formed integral with the pinion 9.

To the frame 1 is attached the segment 35, which segment is provided with notches to hold the lever or handle 33 at the desired point of adjustment, and for the purpose of staying the lever or handle 33 a pin or sliding catch may be provided, the manner of holding said lever being immaterial.

The sand-reel 36 is located substantially as shown in the drawings, and is operated by the friction-wheel 37 by means of the lever 38 and the sliding box 39. When it is desired to throw the spool 5 and the shaft 11 both out of gear, the pinion 9 is moved on the shaft 10 toward the propelling-wheel 23 until the pinion 9 is thrown out of gear with the wheel 12, at which time the power-shaft only revolves, and the sand-pump is operated in the ordinary manner.

For the purpose of changing the throw of the drill-tool the crank 13 is provided with a series of apertures 40; and for the purpose of changing the inclination of the rock-arm a series of apertures is located at the bottom or lower end of the pitman 15.

For the purpose of preventing the rock-arm 16 from tilting by the strain of the pitman the arm 41 is provided and is located substantially as shown in Fig. 2.

Having fully described my invention, what I claim as new, and desire to secure by Letters Patent, is—

In a well-drilling machine, the combination of the frame 1, provided with the center sill 2, the derrick 3, the power-shaft 10, having located thereon the sliding pinion 9, the shaft 11, provided with the wheel 12 and the crank 13, the wheel 7, fixed to the spool-shaft 6, the pinion 8, located upon the shaft 31 and meshing with wheel 7, the worm-wheel 24, the worm-screw 25, the shaft 29, the eccentric 26, the sliding box 27, the rock-arm 16, provided upon its free end with the grooved pulley or wheel 18, the grooved pulleys 21 and 22, the pitman 15, pivotally attached to the rock-arm 16 and journaled to the crank 13, and the drill-rope 20, substantially as and for the purpose set forth.

In testimony that I claim the above I have hereunto subscribed my name in the presence of two witnesses.

PAUL WOMPLER.

Witnesses:
FREEMAN STROH,
D. W. WALTER.